US012686751B2

(12) United States Patent
Stapela et al.

(10) Patent No.: US 12,686,751 B2
(45) Date of Patent: Jul. 21, 2026

(54) PYROLYSIS AND DEPOLYMERIZATION OF TIRE MATERIAL

(71) Applicant: MICROWAVE SOLUTIONS GMBH, Riehen (CH)

(72) Inventors: Annelie Stapela, Riehen (CH); Mathys Johannes Rossouw, Rayton Gauteng (CA)

(73) Assignee: MICROWAVE SOLUTIONS GMBH, Riehen (CH)

( * ) Notice: Subject to any disclaimer, the term of this patent is extended or adjusted under 35 U.S.C. 154(b) by 620 days.

(21) Appl. No.: 18/026,457

(22) PCT Filed: Sep. 16, 2021

(86) PCT No.: PCT/EP2021/075537
§ 371 (c)(1),
(2) Date: Mar. 15, 2023

(87) PCT Pub. No.: WO2022/058455
PCT Pub. Date: Mar. 24, 2022

(65) Prior Publication Data
US 2023/0391980 A1     Dec. 7, 2023

(30) Foreign Application Priority Data

Sep. 18, 2020     (CH) ...................................... 1184/20

(51) Int. Cl.
*C08J 11/12*     (2006.01)
(52) U.S. Cl.
CPC ............ *C08J 11/12* (2013.01); *C08J 2300/30* (2013.01)
(58) Field of Classification Search
USPC ........................................................ 521/41
See application file for complete search history.

(56) References Cited

U.S. PATENT DOCUMENTS 5,084,141 A * 1/1992 Holland ................. B01J 19/126
                                                         201/35

FOREIGN PATENT DOCUMENTS

WO        2010079408 A1     7/2010

OTHER PUBLICATIONS

Undri, Andrea, et al. "Upgraded fuel from microwave assisted pyrolysis of waste tire." Fuel 115 (2014): 600-608. (Year: 2014).*
Undri Andrea et al: "Upgraded fuel from microwave assisted pyrolysis of waste tire", Fuel, IPC Sience and Technology Press, Guildford, GB, vol. 115, Aug. 1, 2013 (Aug. 1, 2013), pp. 600-608, XP028735451, ISSN: 0016-2361, DOI: 10.1016/J.FUEL.2013.07. 058, p. 601; figure 1, p. 602, paragraph 3.1, abstract; figures; examples; tables.
Czajczynska D. et al: "Potential of pyrolysis processes in the waste management sector" Thermal Science and Engineering Progress, vol. 3, Sep. 1, 2017 (Sep. 1, 2017), pp. 171-197, XP055850950, ISSN: 2451-9049, DOI: 10.1016/j.tsep.2017.06.003; paragraphs [02.5], [03.4], [3.4.1], p. 174, left-hand column, paragraph first.
PCT Search Report and Written Opinion dated Dec. 20, 2021 in connection with PCT Application No. PCT/EP2021/075537.

* cited by examiner

*Primary Examiner* — Terressa Boykin
(74) *Attorney, Agent, or Firm* — Eschweiler & Potashnik, LLC

(57)     ABSTRACT

The invention relates to a pyrolysis method and reactor for recovering at least one component from a tire material using thermal decomposition. The tire material is delivered to a pyrolytic chamber (1), exposed to a controlled atmosphere and heated to a decomposition temperature of the at least one component in the pyrolytic chamber (1) by microwave radiation. A variable power microwave radiation at frequencies between 300 MHz and 2500 MHZ is applied to sequentially vary a temperature in the pyrolytic chamber (1) over a temperature range including the decomposition temperature of the at least one component.

16 Claims, 2 Drawing Sheets

PYROLYSIS AND DEPOLYMERIZATION OF TIRE MATERIAL

CROSS-REFERENCE TO RELATED APPLICATION

Figure 1:
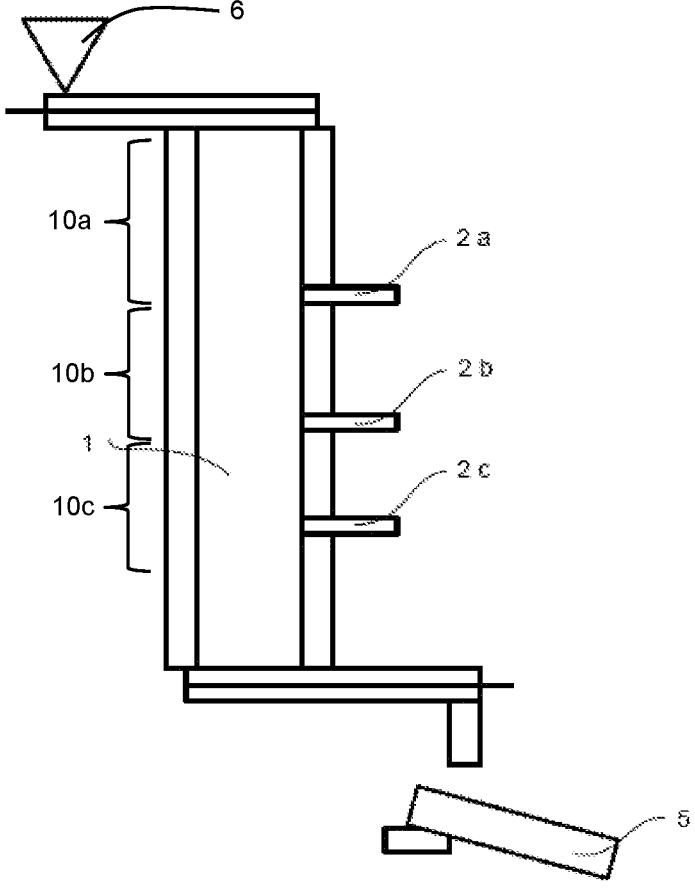

This application is a National Phase entry application of International Patent Application No. PCT/EP2021/075537 filed Sep. 16, 2021, which claims the benefit of priority to Foreign (Switzerland) Patent Application No. 01184/20, filed Sep. 18, 2020. These prior applications are incorporated herein by reference.

The invention relates to a pyrolysis method and a pyrolysis reactor for extracting or recovering compounds from tire materials. Particularly, the invention relates to the pyrolysis or depolymerization of specialty tires and unvulcanised tire or rubber material.

Recent tire innovation has experienced a boom. Tires manufacturers are working relentlessly to make vehicles more efficient, safe and environmentally friendly. These new innovations which can comprise of a mixture of rubbers, plastics, thermoset polymers, electrodes, biomass such as dandelions, polyurethanes, epoxy, resins and others require an advanced recycling/depolymerization technology and processes as solution so that these complex composition of materials in these tires can be recycled or depolymerized successfully to create high quality recyclates or bioproducts for resource circularity.

In the second instance, tire manufacturers have a need for advanced recycling technology to recycle and depolymerize their post production scrap tires such as unvulcanised tires and unvulcanised rubber (green tires), production scrap tires in various stages prior to vulcanization as these are challenging to recycle with mechanical recycling processes and conventional pyrolysis processes.

Tires, plastics, rubber products and polymer composites represent a tire material that is a source of energy and raw products that can be used to create circular economies.

For example, efforts to recycle tires using microwave technology have been described in U.S. Pat. No. 5,507,927. Tires are fed into a microwave chamber as a tire waste stream and are exposed to a reduction atmosphere and microwave radiation. The temperature of the tires is monitored and a power input to the microwave generators is adjusted as required to obtain optimum temperature for reducing the tire material. The chamber is kept at slightly above atmospheric pressure to facilitate removal of gaseous products. Further, the reduction atmosphere is adjusted by increasing the concentration of reducing gases as the tire material breaks down. For reducing the tire material, twelve magnetrons are used, wherein each of them has 1.5 kW of power at a wavelength of 2450 MHz.

Efforts to decompose plastics, which is not itself susceptible to microwave heating, have been described in U.S. Pat. No. 5,084,140. The plastics is mixed with carbonaceous material, such as waste tire material, and subjected to microwave radiation to heat the plastics to 400° C. to 800° C. and cause pyrolysis of the plastics.

In summary, the prior work has involved the use of single-frequency microwave radiation and high frequency systems for recovering specific compounds from tire materials. However, high frequency microwave systems have a low microwave energy penetration into a material to be treated. Further, microwave energy at a frequency of 2.45 GHz is derived from electrical energy with a conversion efficiency of approximately only 50% for 2.45 GHz. The use of multiple small magnetrons in a pyrolysis reactor, that are shut on and off for temperature control, is inefficient and the temperature control is not very precise. Especially, pyrolitical oils, hydrocarbons, monomers and chemicals are very temperature sensitive resulting in yield and quality of the recovered compounds being affected negatively.

It is an object of the invention to provide a pyrolysis process and a pyrolysis reactor that improve the yield and quality of components recovered from tire materials, allow for high volumes of tire materials to be processed, and enhance economic and commercial viability of compounds recovered from tire materials.

These and other objects, which will appear from the description below, are achieved by a pyrolysis method and a pyrolysis reactor for recovering at least one component from a tire material using thermal decomposition as set forth in the appended independent claims. Preferred embodiments are defined in dependent claims.

According to the present invention the tire material is treated by the pyrolysis method by delivering the material to a pyrolytic chamber. In the chamber the tire material is exposed to a controlled atmosphere and heated to a decomposition temperature of at least one component of the tire material. Heating is accomplished by a variable power microwave radiation at frequencies between 300 MHz and 2500 MHz to sequentially vary a temperature in the pyrolytic chamber over a temperature range including the decomposition temperature of the at least one tire material component.

The pyrolysis reactor for recovering at least one component from the tire material according to the present invention comprises a pyrolytic chamber for accommodating the tire material and at least one microwave radiation source as a heat source for heating the tire material to a decomposition temperature of the tire material. Further, a control unit is provided, which comprises a microwave radiation control for applying variable power of microwave radiation at frequencies between 300 MHz and 2500 MHz to the tire material, and a temperature control controlling a sequentially varying decomposition temperature of the tire material.

Advantageously, the temperature in the pyrolytic chamber does not exceed 750° C.

The variable power microwave radiation is generated by the at least one microwave radiation that preferably provides a continuously changeable radiation power. Thus, the microwave radiation and the temperature in the pyrolytic chamber, respectively, are not simply altered in discrete or incremental steps for example by switching on and off magnetrons as known from the prior art. Advantageously, the microwave radiation comprises one or more radiation frequencies between 300 MHz and 2.5 GHz. The applied microwave radiation and chamber temperature can be adjusted in a precise manner over the temperature range of the pyrolysis method.

In general, in the electromagnetic spectrum, microwaves lie between infrared and radio frequencies. The wavelengths of microwaves are between 1 mm and 1 m with corresponding frequencies between 300 GHz and 300 MHz, respectively. The two most commonly used microwave frequencies are 915 MHz and 2.45 GHz. Microwave energy is derived from electrical energy with a conversion efficiency of for example approximately 85% for 915 MHz but only 50% for 2.45 GHz. Most of the domestic microwave ovens use the frequency of 2.45 GHz. Compared with 2.45 GHz, the use of low frequency microwaves of 915 MHz can provide a substantially larger penetration depth which is an important parameter in the design of microwave cavity size, process scale up, and investigation of microwave absorption capacity of materials. Therefore, using low frequency microwaves enhances the efficiency of the pyrolysis method.

Further, the utilization of multiple small magnetrons for generating microwave radiation that are shut on and off for temperature control as known from the prior art are less efficient than a variable power low frequency microwave system as used in the pyrolysis method of the present invention. Radiation from a variable power low frequency microwave system allows for very good temperature control during the recovery of components from the tire material. Most of the pyrolitical oils, hydrocarbons, monomers and chemicals, including plasticizers, are very temperature sensitive resulting in yield and quality being affected negatively in the absence of good temperature control.

According to the present invention the pyrolysis method recovers oils, hydrocarbons, monomers, chemical plasticizers, silica and/or a metal from the tire material. These components are extracted from the material by applying varied microwave power in various zones of the microwave reactor and the zones operate independently from each other. Microwave radiation used is in the range of 300 MHz to about 2.5 GHz. The applied radiation power can be selected according to the decomposition temperature of a target recovery component. The power can be changed variably between different decomposition temperatures of differing target recovery components. Also, the variation in microwave power can adjust the speed of temperature change in the pyrolytic chamber. Thus, conditions in the chamber can be adapted to varying decomposition reactions of differing target recovery components.

Preferably, the tire material is a feedstock or waste material stream comprising plastics, rubber products, polymer composites or tires. Particularly, the tire material is a feedstock or waste material stream comprising self-sealing tires, non-pneumatic tires, tires in combination of biomass such as moss, dandelion, etc., tires incorporating kevlar and/or thermoplastics and/or thermoset polymers, electricity generating tires with electrodes in the tire, tires incorporating thermo-electric and/or piezoelectrical materials, 3-dimensionally printed tires like biosourced tires, tires incorporating shape memory alloys, unvulcanised tires, unvulcanised rubber (known as green tires) and/or production scrap tires in various stages prior to vulcanization.

Plastics comprises ethylene (co)polymer, propylene (co) polymer, styrene (co)polymer, butadiene (co)polymer, polyvinyl chloride, polyvinyl acetate, polycarbonate, polyethylene terephthalate, (meth)acrylic (co)polymer, or a mixture thereof. Rubber products and tires comprise of natural and synthetic rubbers such as styrene butadiene rubber and butyl rubber. These components of the plastics, rubber products and tires are recovered by the pyrolysis method.

Advantageously, the pyrolysis method of the present invention recovers at least one of the components of DL Limonene, isoprene, butadiene, benzene, toluene, o-xylene, m-xylene, p-xylene styrene, phthalates, metals and/or silica.

In one variant of the pyrolysis method according to the present invention the tire material is tempered in the pyrolytic chamber to around −4° C. to recover butadiene, to around 35° C. to recover isoprene, to around 80.1° C. to recover benzene, 110.6° C. to recover toluene, to around 138.3° C. to recover p-xylene, to around 139.1° to recover m-xylene, to around 144.4° C. to recover o-xylene, to around 145.2° C. to recover styrene, to around 178° C. to recover DL Limonene and/or to 300° C.-410° C. to recover phthalates. The indication of the temperatures being around these values shall be understood in that the temperature may deviate slightly from that value but not significantly enough to alter the recovery process of the respective component.

Pyrolytic oils are complex mixtures of different chemical components with a wide range of molecular weights and boiling points. It has been found that condensation fractions obtained by fractional condensation of pyrolytic oils, that are boiling between −4° C. and 600° C., contain commercially valuable chemicals.

According to one aspect of the pyrolysis method of the present invention a pyrolytic oil is subjected to a fractional condensation at temperatures ranging from −4° C. to 600° C. to recover at least on component thereof. Preferably, a component recovered from the pyrolytic oil is selected from the group consisting of paraffins, naphthenes, olefins and aromatics.

The fractional condensation process preferably comprises the steps of a fast extraction of volatiles for reducing volatile residence time in the pyrolytic chamber. Next, the volatile gasses are condensed into different fractional oil components. Optionally, the fractioned components are subjected to a further fractional condensation to isolate at least one more commercially valuable chemical selected from the group consisting of paraffins, naphthenes, olefins and aromatics.

Particularly interesting components identified in the above condensation fractions are as mentioned above: butadiene recovered around −4° C., isoprene recovered around 35° C., benzene recovered around 80.1° C., toluene recovered around 110.6° C., p-xylene recovered 138.3° C., m-xylene recovered around 139.1°, o-xylene recovered 144.4° C., styrene recovered 145.2° C., DL Limonene recovered 178° C., phthalates recovered between 300° C. and 410° C., metals and silica.

These components can be used as solvents and petrochemical feedstock in the synthesis of various polymers enabling resource circularity. For example, styrene is mainly used in the production of plastics, rubber and resins. Xylene is particularly useful in the production of polyester fibers; it is also used as solvent and starting material in the production of benzoic and isophthalic acids. Toluene is also used for the production of benzoic acid. DL Limonene is mainly used as a flavoring agent in the chemical, food and fragrance industries.

Thus, by utilizing the variable power microwave process, under controlled atmosphere, and carrying out the fractional condensation of the pyrolytic oils to recover a fraction boiling in the range of about −4° C. to about 600° C., it is possible to recover the above commercially valuable chemicals.

The controlled atmosphere can be a negative pressure environment applied in the pyrolytic chamber. For example, the pressure in the chamber is at or below 10 kPa.

Preferably, the controlled atmosphere can be realized as a reactive atmosphere to modify the component or products of components formed during decomposition or degradation. The controlled atmosphere is advantageously defined by at least one reactive gas, which may include hydrogen, steam, methane, benzene, or a mixture of reactive gases, such as for example contained in syngas. Advantageously, reactive gases, particularly syngas, formed during the pyrolysis method are partially recycled through the reactor to promote alternate reactions or increase the yield of target liquid or gas products.

Alternatively, an inert atmosphere to prevent oxidation during the pyrolysis process can be applied.

The controlled atmosphere in the pyrolytic chamber can be selected and adapted according to a target component to be recovered by the pyrolysis method.

One embodiment of a pyrolysis reactor according to the present invention comprises a plurality of temperature zones, wherein each temperature zone provides a different temperature for pyrolysis of a different component of the tire material. For example, the reactor may include up to 16 or more different temperature zones, which are independently regulated and can be freely combined.

Further, the a length of the temperature zones and the speed of tire material travelling through the temperature zones may be selected to match to the pyrolysis process of a component. Different components require different time periods for decomposition or degradation. By matching zone length and travelling time the efficiency of the pyrolysis method can be improved The control unit of the pyrolysis reactor my include an analytics and data science based multivariate control system for: feedback control, feedforward control, concurrent control, smart process control, and the development of a data lake. A plurality of sensor can be implemented in the reactor to provide data about temperature, traveling speed, pressure, and other parameters relevant for the recovery of specific components.

In the following one example of the pyrolysis method for recovering a component from tire material according to the present invention is described. As an example for a tire material vulcanized natural rubber is pyrolized. The vulcanized natural rubber was pyrolized by a variable power, low frequency microwave process under the following conditions: vacuum at 10 kPa; at 915 MHz in an L-Band of microwave radiation; at a pyrolysis temperature of 350° C.-370° C.; fast extraction of volatiles; low reactor residence time to prevent secondary reactions. Volatiles were condensed using a fractional condensation process and yielded more than 33% DL Limonene amongst other chemicals. DL Limonene is notoriously sensitive to temperature degradation. The DL Limonene yield is high compared to existing processes such as disclosed in: Roy C., Darmstadt H., Benallal B., Amen-Chen C. "Characterization of naphtha and carbon black obtained by vacuum pyrolysis of polyisoprene rubber. Fuel Process." Technol. 1997; 50:87-103. doi: 10.1016/S0378-3820(96)01044-2. In this reference the DL Limonene yield was 16.6%.

Figure 2:
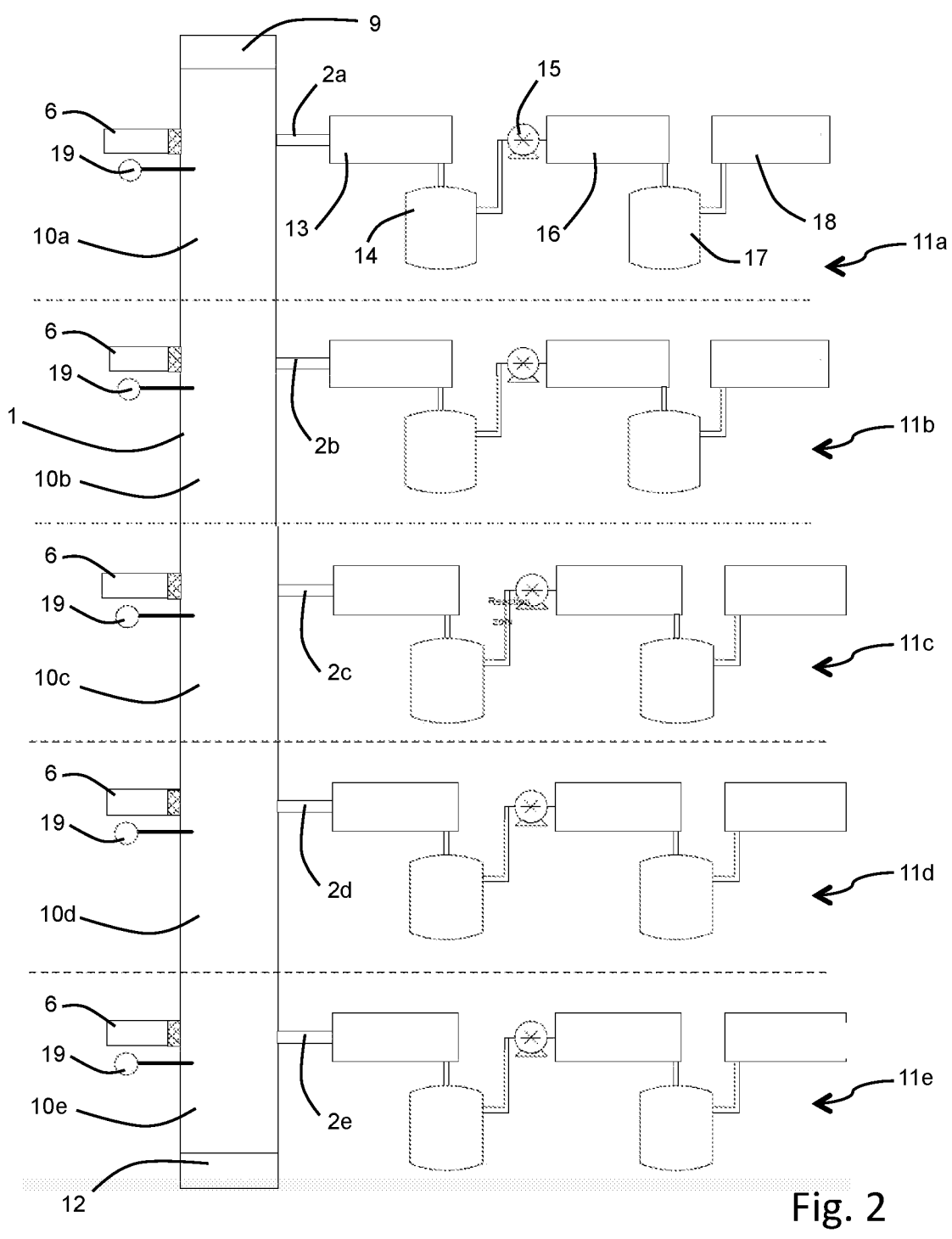

Example embodiments of the invention will be described in the accompanying drawings, which may explain the principles of the invention but shall not limit the scope of the invention or exclude other example embodiments. The drawings illustrate:

FIG. 1: a schematic diagram of a first example set up of a pyrolysis reactor according to the invention, and FIG. 2: a schematic diagram of a second set up of a pyrolysis reactor according to the invention.

In the following two example embodiments of a pyrolysis reactor according to the present invention are described which are suitable to perform a pyrolysis method for recovering at least one component from a tire material using thermal decomposition according to the invention. In both of the embodiments, the pyrolysis reactor for thermal decomposition of tire materials, particularly pyrolytic oils, hydrocarbons, monomers and chemicals from feedstock and waste streams such as tires, plastics, rubber products and polymer composites, comprises a pyrolytic chamber 1 for accommodating the tire material.

Further, the example embodiments of the pyrolysis reactor comprise at least one microwave radiation source as a heat source for heating the tire material to a decomposition temperature of the tire material. A control unit is provided, which comprises a microwave radiation control for applying microwave radiation of variable power at frequencies between 300 MHz and 2500 MHZ to the tire material, and a temperature control for controlling a sequentially varying decomposition temperature of the tire material.

The two example embodiments mainly differ in the design of their pyrolytic chamber, while other features of the reactor and steps of the method are the same. Therefore, structural features of the reactor and explanations of method steps that are suitable for both example embodiments and shall be regarded as interchangeable between the two example embodiments.

For example, for both example embodiments it is advantageous to define that the temperature range of the pyrolysis method extends between −20° C. and 750° C., particularly between −4° C. and 600° C., and preferably does not exceed 750° C. The microwave radiation is advantageously selected from an VHF-Band, S-Band, UHF-Band and/or L-Band of the microwave spectrum. The example embodiments are suitable to pyrolyse a pyrolytic oil and subjected it to a fractional condensation at a temperature range between −4° C. and 600° C. The pyrolytic chamber may comprise a controlled atmosphere in form of a negative pressure environment, particularly a pressure below 10 kPa, or the controlled atmosphere is defined by at least one reactive gas, particularly a gas selected from hydrogen, steam, methane, benzene or a mixture thereof. The example embodiment allow for the extraction of volatile gasses from the pyrolytic chamber and condensing the gasses into different fractional oils. In the same way other features and steps apply to both of the embodiments.

FIG. 1 shows an example embodiment of the a pyrolytic reactor in the form of a continuous flow retort with an elongated design. For example, it may comprise a conveyor to deliver tire material to the pyrolytic chamber 1 and transfer the material and decomposed components thereof through the pyrolytic chamber 1.

For example, complete tyres, plastics, rubber products and polymer composites can intermittently be fed into the pyrolytic chamber 1 from a first end of the chamber. An air lock system with means for purging of oxygen can be provided at the first end.

Pyrolysis gases are drawn off at intervals along the length of the pyrolytic chamber 1, wherein successive exit ports 2 are provided at points of increasing product temperature and different gases or compounds can be collected. In the variant of FIG. 1, gases are collected from exit ports 2*a*, 2*b* and 2*c* at three positions on the side of the chamber, that correspond to three different recovery components. Solid products may be discharged through an 5 system at an end of the pyrolytic chamber 1 and may be separated using a suitable method, such as a vibrating screen 5 or the like.

A process control unit, such as a programmable logic controller (PLC), is used to control the pyrolysis process according to the invention. The control unit comprises a microwave radiation control for applying microwave radiation of variable power at frequencies between 300 MHz and 2500 MHz to the tire material and a temperature control controlling a sequentially varying decomposition temperature of the tire material. Also, the control unit can control the temperature at various successive heat zones 10 along the pyrolytic chamber 1. Preferably, the sequential pyrolysis is performed sequentially increasing the decomposition temperature.

In the example pyrolysis reactor shown in FIG. 1 tire material is introduced into a first end of the pyrolytic chamber 1 by a conveyor and transported along the length of the pyrolytic chamber 1. In the course of the sequentially increasing decomposition temperature the pyrolytic chamber and the tire material respectively are first heated to a first decomposition temperature of a first component of the tire material within a first heat zone, by a low frequency variable power microwave radiation. First products may be evacuated through a first exit port 2a. In the example having three heat zones shown in FIG. 1, the temperature in the first heat zone 10a is for example around 35° C. to recover isoprene, the temperature in the second heat zone 10b is for example around 110.6° C. to recover toluene, and the temperature in the third heat zone 10c is for example around 145.2° C. to recover styrene.

The pyrolytic chamber 1 can be designed as a continuous reactor and the subsequent heat zones can merge into each other.

At a second end of the pyrolytic chamber 1 further recovery components or feedstock remnants may be discharged through the airlock system 5.

FIG. 2 shows a reactor in the form of a continuous flow retort with an elongated design. Since microwave energy heats the bulk of the tire material directly it is possible to obtain zones of different recovery components, each at a different temperature, in close proximity along the length of the reactor. That means the reactor is virtually divided into several successive heat zones for the waste material. Successive heat zones 10a to 10e are indicated for the reactor embodiment shown in FIG. 2.

Pyrolysis gases are drawn off at intervals along the length of the pyrolytic chamber 1, wherein successive gas exit ports 2 are provided at points of increasing component decomposition temperature and the gases collected, corresponding to different components of tire material, will differ.

In the embodiment of FIG. 1, off-gases are collected from exit ports 2a, 2b and 2c at three positions on the side of the chamber, that correspond to 3 different component temperatures. In the variant of FIG. 2, off-gases are collected from five exit ports 2a, 2b, 2c, 2d and 2e, providing several exit ports along the length of the chamber 1. This allows for physical separation of the different volatile products through individual condenser systems 11a to 11e associated to the exit ports. Solid products are discharged through a second airlock system 12 or with a screw feeder at a second end of the pyrolytic chamber 1.

The PLC also monitors the temperature of the material, reaction vessel and volatiles exiting the reactor at the gas exit ports 2, and at the various decomposition heat zones 10 along the length of the reactor. Online and offline analysis of the pyrolysis products may also be used to provide inputs to the control unit. Based on the data collected the process control unit regulates the microwave power input into the heat zones and the residence and travelling time of the material in the reactor. By varying the microwave power in the different heat zones of the reactor the material is heated to predefined temperatures corresponding to decomposition temperatures of differing material components to allow these components to decompose in each heat zone and the volatiles produced during the decomposition of that component, to be collected in a dedicated condenser and collection vessel. In subsequent heat zones the remaining material components are for example heated to successively higher decomposition temperatures, each time extracting the volatile components associated with the different material components and collecting it in separate condenser systems 11.

This sequential decomposition of differing material components allows the different components produced to be collected separately.

After passing the exit ports 2a-2e the respective volatile products enter condenser systems 11a-11e associated to the exit ports. In one embodiment such a condenser system comprises a first condenser 13 connected to a first collection vessel 14. A vacuum pump 15 is connected to the first condenser 13 and the first collection vessel 14 to provide a controlled atmosphere as mentioned above. Thus, the first condenser 13 and the first collection vessel 14 may define a low pressure condenser and collection portion. This portion is connected to an ambient or high pressure portion comprising a second condenser 16 connected to a second collection vessel 17. Further components of the volatile product are condensed in the second condenser 16 and collected in the second collection vessel 17. A third collection vessel 18 gathers the non-condensable gases exiting from the pyrolytic chamber 1.

Although not provided with individual reference signs in FIG. 2, each of the heat zones 10a-10e are connected to the condenser systems 11a-11e comprises a first collector vessel 14, a second collector vessel 17 and a third collector vessel 16, which together provide different storage systems for the differing components exiting the pyrolysis chamber 1 at the exit ports 2a-2b. The recovered components can be extracted from the vessels for further use or appropriate disposal.

Although the heat zones 10a-10e are separated by dashed lines for illustrative reasons, the pyrolytic chamber 1 can be designed as a continuous reactor and the subsequent heat zones merge into each other. Each of the heat zones has a heating port, preferably a microwave feed port 6, to heat each of the zones to the target decomposition temperature. Further, each of the heat zones may be provided with a temperature sensor 19, for example a thermocouple, to monitor the temperature and provide temperature data to a process control system (not shown).

The pyrolysis method and the pyrolysis reactor according to the present invention relies on the fact that each of the material components present in a tire material has different boiling points and microwave absorption properties. The application of variable power microwave radiation at frequencies between 300 MHz and 2500 MHZ to sequentially vary the temperature in the pyrolytic chamber over a temperature range including the decomposition temperature of recovery component ensures a high yield of recovery and high quality of the recovered components.

LIST OF REFERENCE NUMBERS 1 pyrolytic chamber
2a,b,c exit ports
3 slots
5 vibrating screen
6 feed port
7 rubber tyre
8 centre portion
10a,b,c heat zones
11a,b,c condenser system
12 second air lock system
13 first condenser
14 first collection vessel
15 vacuum pump
16 second condenser
17 second collection vessel
18 third collection vessel
19 temperature sensor

The invention claimed is:

1. Pyrolysis method for recovering differing material components of tire material using thermal decomposition, wherein the tire material is delivered to a pyrolytic chamber (1), and exposed to a controlled atmosphere and heated to a decomposition temperature of the differing material components in the pyrolytic chamber (1) by microwave radiation, characterized in that a variable power microwave radiation at frequencies between 300 MHz and 2500 MHz is applied to sequentially vary a temperature in the pyrolytic chamber (1) in a temperature range including predefined temperatures of the differing material components to sequentially increase the decomposition temperature in the pyrolytic chamber, resulting in a sequential decomposition of differing material components and separately collecting the differing recovered material components through several successive exit ports provided at points of increasing product temperature along a length of the pyrolytic chamber.

2. Pyrolysis method according to claim 1, wherein the temperature range does not exceed 750° C.

3. Pyrolysis method according to claim 1, wherein the temperature range extends between –20° C. and 750° C.

4. Pyrolysis method according to claim 1, wherein the tire material is a feedstock or waste material stream comprising plastics, rubber products and/or polymer composites.

5. Pyrolysis method according to claim 1, wherein the tire material is a feedstock or waste material stream comprising self-sealing tires, non-pneumatic tires, tires in combination of biomass, tires incorporating kevlar and/or thermoplastics and/or thermoset polymers, electricity generating tires with electrodes in the tire, tires incorporating thermo-electric and/or piezoelectrical materials, 3-dimensionally printed tires, tires incorporating shape memory alloys, unvulcanised tires, unvulcanised rubber and/or production scrap tires in various stages prior to vulcanization.

6. Pyrolysis method according to claim 1, wherein at least one recovered component of the different recovered material components is an oil, a hydrocarbon, a monomer, a chemical plasticizer, silica and/or a metal.

7. Pyrolysis method according to claim 1, wherein at least one recovered component of the different recovered material components is DL Limonene, isoprene, butadiene, benzene, toluene, o-xylene, m-xylene, p-xylene styrene, phthalate, a metal and/or silica.

8. Pyrolysis method according to claim 7, wherein the tire material is tempered by the variable power microwave radiation at frequencies between 300 MHz and 2500 MHz to, to predefined temperatures around 35° C. to recover the material component isoprene, to around 80.1° C. to recover the material component benzene, 110.6° C. to recover the material component toluene, to around 138.3° C. to recover the material component p-xylene, to around 139.1° to recover the material component m-xylene, to around 144.4° C. to recover the material component o-xylene, to around 145.2° C. to recover the material component styrene, to around 178° C. to recover the material component DL Limonene and/or to 300° C.-410° C. to recover the material component phthalates.

9. Pyrolysis method according to claim 1, wherein at least one recovered component of the different recovered material components is a pyrolytic oil that is subjected to a fractional condensation at a temperature range between –4° C. and 600° C.

10. Pyrolysis method according to claim 9, wherein the recovered pyrolytic oil is selected from the group consisting of paraffins, naphthenes, olefins and aromatics.

11. Pyrolysis method according to claim 1, wherein the controlled atmosphere is a negative pressure environment applied in the pyrolytic chamber, particularly a pressure at or below 10 kPa.

12. Pyrolysis method according to claim 1, wherein the controlled atmosphere is realized as a reactive atmosphere by at least one reactive gas.

13. Pyrolysis reactor for recovering differing material components from a tire material using thermal decomposition, comprising a pyrolytic chamber for accommodating the tire material and at least one microwave radiation source as a heat source for heating the tire material to a decomposition temperature of the tire material, characterized in that a control unit is provided, which comprises a microwave radiation control which is configured for applying microwave radiation of variable power at frequencies between 300 MHz and 2500 MHz to the tire material, and a temperature control which is configured for controlling sequentially varying predefined temperatures corresponding to decomposition temperatures of differing material components of the tire material to sequentially increase the decomposition temperature in the pyrolytic chamber, wherein several successive exit ports are provided at points of increasing product temperature along a length of the pyrolytic chamber for separately collecting the differing recovered material components along a length of the pyrolytic chamber.

14. Pyrolysis reactor according to claim 13, wherein the reactor comprises a plurality of temperature zones, each temperature zone providing a different temperature for pyrolysis of the different components of the tire material.

15. Pyrolysis reactor according to claim 14, wherein a length of a temperature zone is matched to the pyrolysis of a component.

16. Pyrolysis reactor according to claim 14, wherein the reactor comprises at least two collection vessels for collecting recovered components.

* * * * *